Feb. 16, 1965 C. J. BOGNAR 3,169,429
METHOD AND APPARATUS FOR ACCELERATING A FLYING TOOL
Filed June 28, 1960 5 Sheets-Sheet 1

INVENTOR.
CHARLES J. BOGNAR
BY
Oberlin, Maky & Donnelly
ATTORNEYS

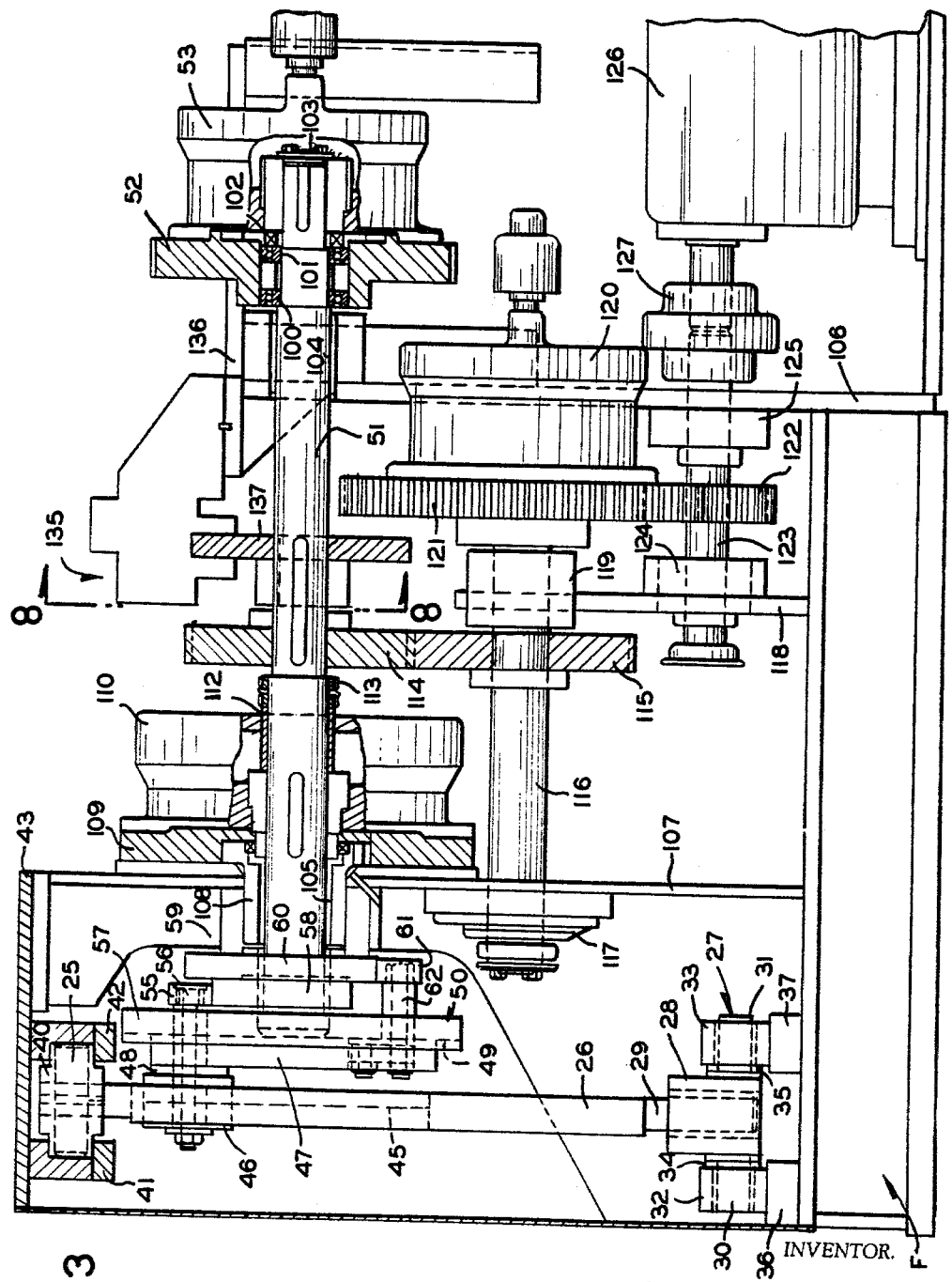

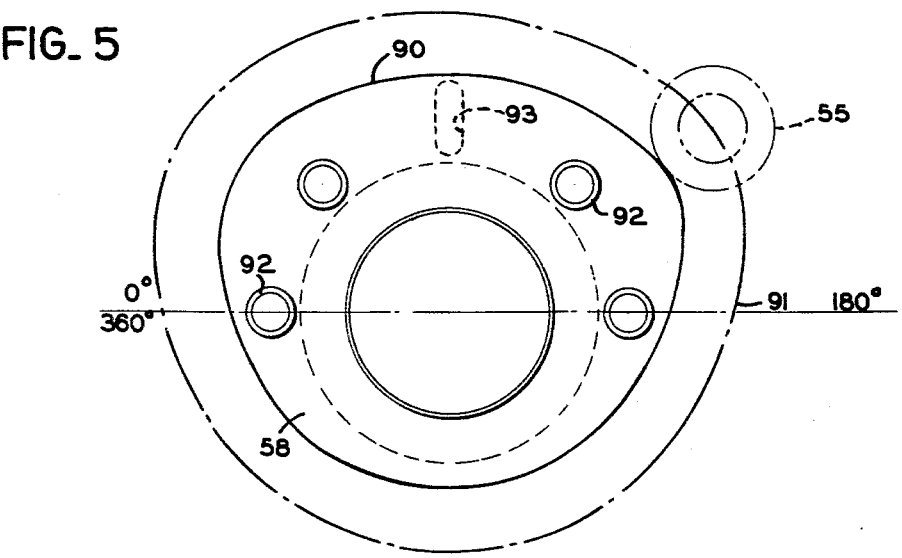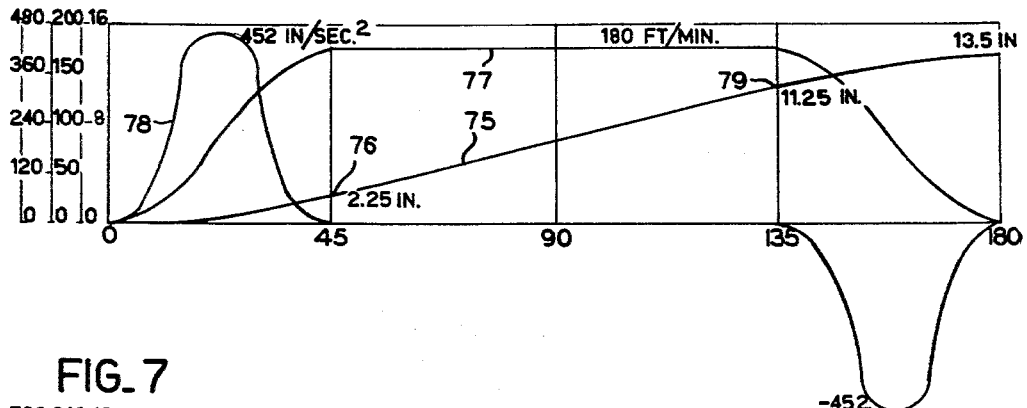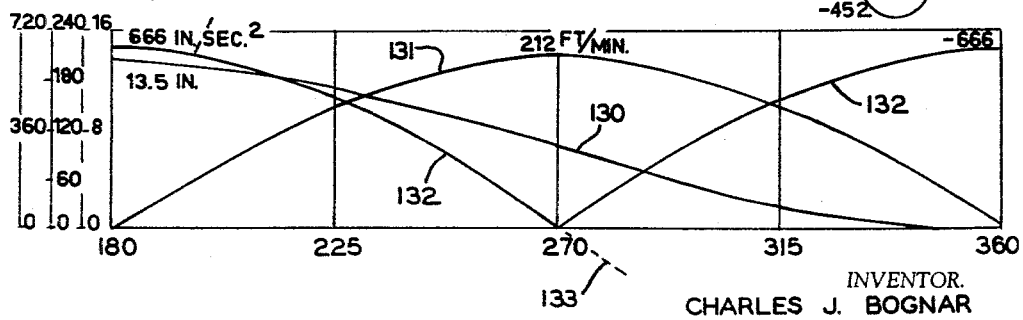

INVENTOR.
CHARLES J. BOGNAR
BY
Oberlin, Maky & Donnelly
ATTORNEYS

Feb. 16, 1965   C. J. BOGNAR   3,169,429
METHOD AND APPARATUS FOR ACCELERATING A FLYING TOOL
Filed June 28, 1960   5 Sheets-Sheet 5

*INVENTOR.*
CHARLES J. BOGNAR
BY
Oberlin, Maky & Donnelly
ATTORNEYS

United States Patent Office 3,169,429
Patented Feb. 16, 1965

3,169,429
METHOD AND APPARATUS FOR ACCELERATING A FLYING TOOL
Charles J. Bognar, Parma, Ohio, assignor to The Yoder Company, Cleveland, Ohio, a corporation of Ohio
Filed June 28, 1960, Ser. No. 39,250
17 Claims. (Cl. 83—38)

This invention relates, as indicated, to a flying tool mechanism and more particularly to a flying shear type cut-off mechanism adapted to sever lengths of rapidly moving elongated stock.

It is, of course, ordinarily necessary in a device for severing or otherwise locally working elongated moving objects, for such device to move with the stock at the same rate of speed in order to sever or properly work a predetermined length thereof, and a difficult problem is encountered in accelerating the device to the speed of the stock issuing from a forming mill or the like inasmuch as such device represents a considerable mass and the stock may be moving at very high speed. Accordingly, when operating at such high speeds, it has been a problem to obtain uniform predetermined lengths and it is an important object of this invention to provide an improvement in a flying shear or the like enabling much more accurate cuts to be made even when operating at extremely high speeds.

Heretofore, at slow speed operation, there has generally been sufficient time to accelerate a die type cut-off mechanism or the like to the speed of the traveling stock, actuate such cut-off mechanism, brake the die-type cut-off mechanism to a stop and return the same to its original position. However, as the speed of the mill or line increases, the condition alters such that the time required for a cycle of the cut-off mechanism fast approaches the time required by the length to be severed to move therepast. Since the severing action itself requires very little time, the acceleration and deceleration of the cut-off mechanism and its return to the original position must be speeded up and yet the movement of such cut-off mechanism must be synchonized with the movement of the stock to obtain accurate cuts. As aforesaid, the shear of cut-off mechanism represents a considerable mass, and if the objective of high speed be paramount, then a difficult problem is indeed encountered.

It is accordingly a principal object of this invention to provide an improvement in cut-off mechanisms and the like enabling much more accurate cuts to be made even when operating at very high speeds.

It is another object to provide a flying shear or like mechanism which will very rapidly accelerate to the speed of the stock, effect the severing thereof, decelerate to a stop, and return to its original position.

It is yet another object to provide such shear accelerating mechanism which may be driven from the mill itself, always to drive the cut-off mechanism in synchronism therewith.

It is a further object to provide a flying shear type mechanism which may readily be actuated by a tachometer generator or other automatic counter to obtain extremely accurate lengths.

It is a still further object to provide such flying shear mechanism which will always be returned to exactly the same starting position.

It is still another object to provide such acceleration mechanism for flying shears or the like which can readily and easily be installed in any existing mill line.

Other objects and advantages of the invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 3 is an enlarged detail fragmentary sectional view of the drive mechanism for the acceleration device;

FIG. 5 is an enlarged detailed view of the drive cam;

FIG. 6 is a graph showing the acceleration, velocity, and displacement obtained during the cut-off cycle of the mechanism;

FIG. 7 is a graph showing such acceleration, velocity, and displacement during the return cycle of the cut-off mechanism;

Figure 1:
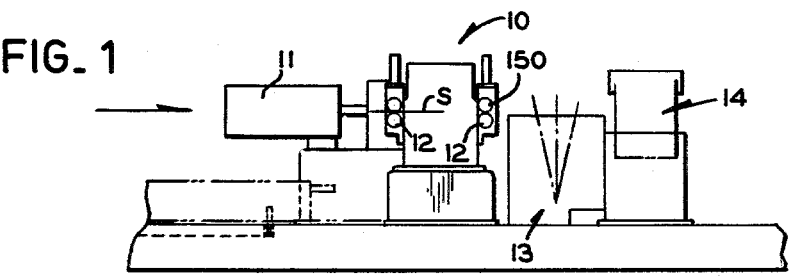
FIG. 1 is a fragmentary elevational view of a mill employing this invention.

Referring now to the annexed drawings and more particularly to FIG. 1, it will be seen that the embodiment of the invention illustrated is employed with a cut-up line in which the stock may be uncoiled from large diameter coils to pass through a side trimmer, slitter, and then through a leveler or the like 10 driven by motor 11 through a conventional speed reducer so that stock S will pass through the rolls 12 of the leveler properly to finish the same prior to severing. Positioned adjacent the leveler 10 is the acceleration unit of the cut-off mechanism generally shown at 13 driving the cut-off press 14 to sever the lengths of elongated stock coming from the leveler 10.

Figure 2:
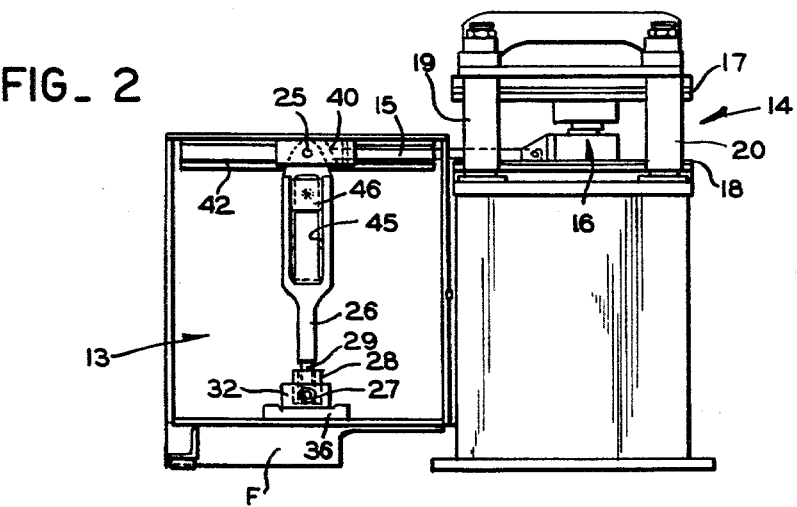
FIG. 2 is an enlarged end elevational view of the accelerator mechanism and die-type cut-off as seen in FIG. 1.

As seen in more detail in FIG. 2 with the accelerator cover plate removed, the accelerator 13 is connected to the cut-off mechanism by means of a push rod 15. The punch and die of the cut-off mechanism generally shown at 16 are mounted for reciprocation in the upper guides 17 and the lower guides 18 respectively and may be brought together by actuation of the cut-off to bring the top punch down against the lower die. The punch and die may be brought together by conventional cut-off actuating mechanism with the columns 19 and 20 telescoping to permit such movement of the punch and die. The cut-off mechanism per se is, however, conventional and forms no part of the present invention.

The push rod 15 which reciprocates the cut-off mechanism 16 in the slides 17 and 18 is pivotally connected at 25 to a pivot arm 26, the base of which is pivoted as at 27 to the machine frame F. The pivot 27 includes a bushing 28 in which the tip or lower end 29 of the pivot arm 26 is slidably mounted and the bushing is then provided with oppositely extending pivot pins (see FIG. 3) comprising the pivot 27. These pivot pins 30 and 31 are mounted in bearing blocks 32 and 33 each of which is provided with flanged bearings 34 and 35 whereby the proper oscillating pivot for the lower end of the pivot arm 26 is obtained. The bearing blocks 32 and 33 are mounted on pedestals 36 and 37 which are in turn mounted directly on the machine frame F.

The pivot 25 between the push rod 15 and the upper end of the pivot arm 26 is provided by a yoke 40 with the rod 15 being secured to the bight portion thereof. The yoke 40 is mounted between two gibs 41 and 42 for sliding movement, such gibs being mounted on a top gib plate 43 supported on the machine frame. Accordingly, the upper end of the pivot arm 26 is pivotally connected to the push rod 15 whereas the lower end is slidably mounted in the bushing 28 which is in turn pivoted to the machine frame F.

As seen more clearly in FIGS. 2 and 3, the upper end of the pivot arm 26 is provided with a slideway 45 in which there is mounted a slide block 46. The slide block 46 is pivotally connected to slide 47 by a drive pin 48, with the slide 47 being mounted in a diametral slot or slideway 49 in the face of drive shaft plate 50. The plate 50 is mounted on drive shaft 51 driven by gear 52 through clutch 53. It can now be seen that rotation of the shaft 51 through the gear 52 and clutch 53 will impart a rotation to the plate 50 and also to the slide 47 carried thereon. This will in turn rotate the slide block 46 to cause oscillation of the pivot arm 26.

The slide 47 is also mounted for radial movement on the plate 50 within the slot 49 and this radial movement is produced by a cam follower 55 mounted on drive stud 56 extending through and holding together the slide block 46, drive pin 48 and slide 47. This drive stud also extends through an axially slotted portion 57 in the plate 50 whereby radial movement may be imparted to the slide 47. The follower 55 follows the contour of drive cam 58 which is carefully calculated and which is fixed to the machine frame F as shown at 59. Thus the cam 58 and follower constitute a force means to obtain a controlled radial movement for the slide 47. Since the shaft 51 will be driven at rather high angular velocities, it has been found important to insure that the profile of cam 58 will be followed positively and in order to accomplish this there is provided a follower cam 60 also mounted on the machine frame. A follower 61 follows the profile of the follower cam 60 and is mounted on stud 62 extending through an axial slot in the plate 50 and fastened to the slide 47. Since the followers 55 and 61 are held rigidly spaced by the slide 47, and the contours of the cam 58 and 60 are chosen so that the respective followers will always be in engagement therewith, it will be seen that the follower 55 will be caused to hold to the profile of the drive cam 58 regardless of the angular velocity imparted to the drive shaft 51.

Figure 4:
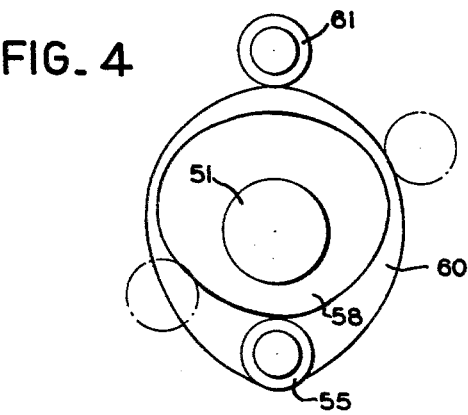
FIG. 4 is an end elevation of the displacement cam employed with this invention.

Reference may now be had to FIG. 4 for a schematic profile illustration of the drive and follower cams and their respective followers 55 and 61. Since the distance between the followers 55 and 61 will always be equal, both such followers will always remain in contact with the contours of the respective cams.

It can now be seen that rotational motion of the shaft 51 will cause rotation of the plate 50 and, of course, the slide 47 slidably mounted thereon to rotate the drive pin 48 and thus the slide block 46 with the slot 45 in pivot arm 26 allowing for complete 360° rotation for the drive shaft. This motion will then be imparted to the pivot arm 26 in the form of an oscillation about the pivot 27 and, since such arm is pivotally connected to the push rod 15 as at 25, a controlled reciprocation of such push rod will then be obtained.

The contour of the drive cam 58 shown in more detail in FIG. 5 is chosen to obtain a cycloidal acceleration of the cut-off die during the initial rotation of the shaft and then a constant velocity at the velocity of the moving stock for the major part of the rotation with the die then coming to a stop with a cycloidal deceleration during the final portion of rotation. The movement of the cut-off press in one direction is obtained through a 180° rotation of the shaft 51 and the return is obtained through a rotation of the shaft through the remaining 180° of a complete revolution of the shaft. In the illustrated embodiment, FIGS. 6 and 7 show graphically the various acceleration, velocity and displacement curves per degree of rotation of the shaft 51. As seen in FIG. 6, the horizontal axis of the graph is marked out at 0, 45, 90, 135 and 180° for the cut-off stroke of the press. The total displacement of the press which is 13.5 inches is shown by the gradually sloping curve 75. Thus, during the initial 45° of rotation, the press will move approximately 2¼ inches as shown by the point 76. During this initial 45° of revolution, the velocity of the press increases from 0 to, for example, 180 feet per minute, as shown by the curve 77. The acceleration as shown by the curve 78 jumps during this initial 45° to a maximum of 452 inches per second per second and then back to 0 as the velocity approaches its maximum of 180 feet per minute. During the next 90° of revolution, the acceleration is 0 and the velocity is constant at 180 feet per minute and the die or press displacement increases to 11¼ inches, as shown at 79, and with 2¼ inches of displacement remaining, the press then decelerates to 0 velocity. Thus, the velocity swiftly drops to 0 as the acceleration proceeds again to minus 452 inches per second with the displacement continuing to the total of 13.5 inches. Accordingly, during 9 inches of the total 13.5 inches of press travel, the velocity of such press will be constant and the same as that of the traveling stock. It is during this constant velocity period of movement of the press that the cut-off is actuated to sever the length.

As seen in FIG. 5, the drive cam 58 obtains this constant velocity period by having a top or flattened portion 90 which distorts the simple harmonic motion that would normally be obtained with a circular cam. The follower 55 will follow the path 91, causing the proper movement of the pivot arm 26. The drive cam is provided with four holes 92 enabling the same to be bolted directly to the machine frame through the follower cam 60 and a keyway 93 may also be employed to hold the same firmly in place in proper relation to the follower cam.

Referring again to FIG. 3, it will be seen that the gear 52 which is driven by the stock or by the mechanism driving the stock leveler rolls 12 is mounted on the shaft 51 by spaced bearings 100 and 101 and a bearing closure 102 may be employed between the gear and the pneumatic clutch 53 in a conventional manner with the shaft 51 terminating in a retainer plate 103. The clutch 53 may, for example, be a conventional "Wichita" clutch No. ATD-209 and upon actuation provides a driving connection between the gear 52 and the shaft 51 which would otherwise be free to rotate thereon.

The clutch end of the shaft 51 is mounted in the machine frame by means of a bronze or like bearing 104 and the other end of the shaft is mounted in a similar flanged bearing 105. Thus the shaft 51 is mounted on the machine between the upright portions 106 and 107 of the frame F by the respective bearings 104 and 105. A bearing retainer 108 may be employed to hold the flanged bearing 105 in place and adjacent such bearing there is mounted a brake retaining plate 109 adjacent air brake 110, which may be, for example, a "Wichita" brake No. ATD-111. The spacer 112 may be held in place by a locknut 113 positioned next to gear 114 keyed to shaft 51 which meshes with gear 115 of the same pitch diameter keyed to jack shaft 116. This jack shaft is mounted for rotation on the upright 107 of the frame F by, for example, a "Link Belt" flanged cartridge block 117. The opposite end of such jack shaft 116 is mounted on frame upright 118 by bearing 119 and has an air clutch 120 directively engaging such jack shaft 116 with a gear 121, in a manner identical to the engagement by the clutch 53 of the gear 52 on the main shaft 51. This gear is driven by a small diameter pinion 122 mounted on shaft 123 which is supported by bearings 124 and 125 on the upright frame portions 118 and 106 and is driven by motor 126 through shaft coupling 127.

Motor 126 is an independent motor driving the jack shaft 116 at high speed so that when the die has completed its cut a limit switch hereinafter described will engage the clutch 120 to increase the speed of the cycle to return the press to its original position.

Referring now to the graph of the displacement, velocity and acceleration during the return cycle shown in FIG. 7, it will be seen that the displacement of the press represented by the gradually sloping curve 130 will return from the 13.5 maximum displacement at 180° of rotation to the 0 displacement at 360° rotation. The velocity represented by the curve 131 will go from 0 at 180° of rotation to a maximum of 212 feet per minute at 270° of rotation and then back to 0 at the completion of the cycle at 360° of rotation. The acceleration represented by the curve 132 will go from 666 inches per second per second at 180° of revolution to 0 at the maximum velocity point at 270° of revolution and then to a minus 666 inches per second per second at the completion of the cycle at 360° of revolution. It is noted that the minus acceleration curve has been shown as positive for convenience of illustration and it will readily be understood that the curve would normally extend in the dotted line direction shown at 133.

Figure 8:
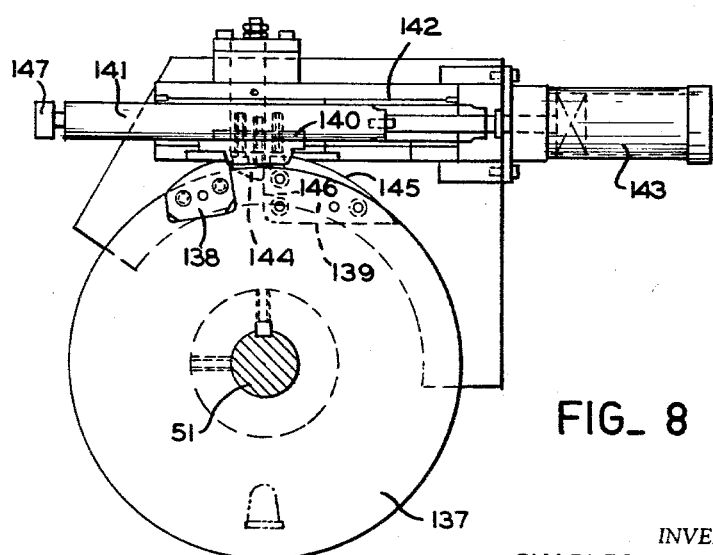
FIG. 8 is a fragmentary detailed view of the positive start repositioner employed with the mechanism as seen on the line 8—8 of FIG. 3.

Referring again to FIG. 3 and also to FIG. 8, in order to provide for a complete cycle of revolution for each stroke of the press, I provide a positive start repositioner generally shown at 135 in FIG. 3. This repositioner may be mounted on a shelf 136 on the frame upright 106 and cooperates with a circular plate 137 keyed to the shaft 51. The plate 137 has a reset cam 138 bolted to the front thereof and a positive start cam 139 bolted to the rear thereof. The spacing of the two cams about the periphery of the plate 137 is seen in FIG. 8 and adjacent the edge of the circular plate 137 there is positioned a cam or plunger 140. This cam is bolted to a positioner rod 141 mounted in cylindrical guide 142 and actuated by piston-cylinder assembly 143. A spring pressed stop 144 is mounted adjacent the plate 137 on the same side thereof as the cam 139 and the tip of such stop will ride over the cam surface 145 of such cam and snap behind the shoulder 146 thereof as the shaft 51 completes its 360° of revolution. When the brake 110 is energized to bring the shaft 51 to a stop, it will be stopped somewhere beyond the dead-center position with the follower 55 slightly beyond the 0–360° position shown more particularly in FIG. 5. This may, for example, be approximately 12 to 14° beyond this position. At this time, the stop 144 will have snapped behind the shoulder 146 of the positive start cam 139 and as soon as the brake is released, the piston-cylinder assembly 143 will be energized to move the plunger or cam 140 to the left as shown in FIG. 8 engaging the reset cam 138. This reversely rotates the plate 137 and, of course, the shaft 51. This reverse rotation will continue until the positive start cam 139 abuts against the face of the abutment 144 which has snapped therebehind. At this position, a limit switch 147 will be contacted by the tip of the rod 141 to cause reverse movement of the piston-cylinder assembly 143 to draw the plunger 140 out of the way and the device becomes clear for the next cycle of operation of the acceleration mechanism.

*Operation*

In order to measure the length of the elongated stock to be severed, this invention will preferably employ an electronic counter as, for example, a "Dynapar Rotopulser," which employs a conventional tachometer generator which may be driven by a stock driven roll 150 (see FIG. 1). Such a counter generates electrical pulses and, for example, one rotation of the roll 150 may produce as many as 1800 pulses. In one form, the roll 150 may drive a wheel or chopper disk having apertures therein interrupting a light source with respect to a photocell, the resultant impulses being transmitted to a preset counter. Thus, each impulse represents a very minute length of stock and the counter may be set to obtain the desired length of severed material. The counter, however, forms no part of the present invention and such are commercially available, being manufactured, for example, by the Berkeley Instrument Company, of Richmond, California.

Figure 9:
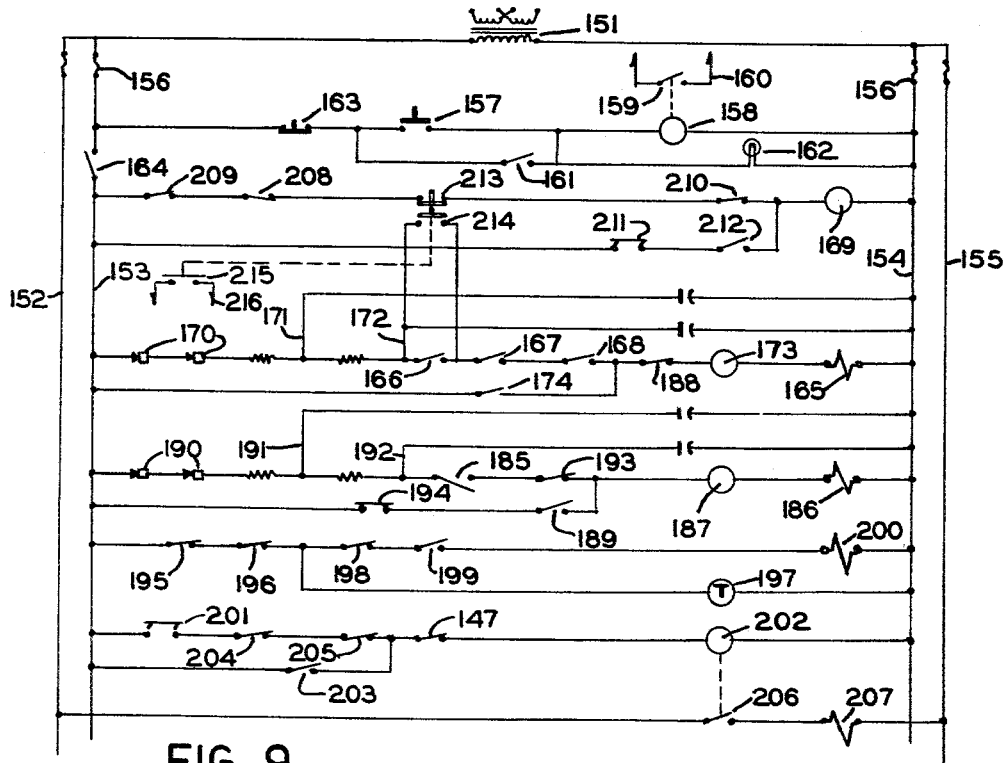
FIG. 9 is a schematic electrical wiring diagram of the controls that may be employed in an installation of the cut-off mechanism.

Referring now to FIG. 9, it will be seen that a control circuit may include, of course, a transformer 151 conducting the proper A.C. current to power mains 152, 153, 154 and 155 through conventional fuses 156. A start button 157 may be provided to energize cut-off relay 158 controlling switch 159 in mill-run circuit 160 and also closing holding switch 161 as well as energizing signal lamp 162. A stop push button switch 163 may also be employed in series with the aforedescribed switches and relay to deenergize the same when desired. Cut-off relay 158 also closes normally open switch 164 in main line 153 so that energization of the various electrical components of the circuit now to be described may be obtained.

At this time, the accelerator and press in the starting position and the press at top dead center, the generator or "Rotopulser" signals solenoid 165 through the preset counter by closing switch 166. Switch 167 will be closed by the energization of the mill-run circuit 160 and switch 168 will be closed by energization of reset relay 169 which was energized at the completion of the previous cut-off. Rectifiers 170 together with the proper filter circuits 171 and 172 will ensure an instantaneous response, energizing solenoid 165 when the switch 166 is closed by the counter. Energization of the solenoid 165 will engage the clutch 53 to drive shaft 51 from gear 52 which is driven directly from the forming or leveling power source, as shown more clearly in FIG. 10. Energization of the solenoid 165 simultaneously energizes relay 173, closing holding switch 174 and with the solenoid 165 energized, the accelerator driven cut-off press accelerates until the mill speed is reached. As seen in FIG. 6, this is approximately after 45° of rotation and 2¼ inches of press displacement. As soon as the mill speed is reached, the press trips a limit switch (not shown) causing the press to make the cut.

After the press has made its cut, the upward movement of the press head trips limit switch 185 which then energizes solenoid 186. Solenoid 186 controls air clutch 120 to connect the high speed drive motor 126 to the shaft 51 to drive the same at high speed through the remainder of the forward stroke and through the return stroke, retracting the die or press. The energization of solenoid 186 also energizes relay 187 to open switch 188 in series with the solenoid 165 to deenergize the same. This relay also closes holding switch 189 to maintain the solenoid 186 energized. Rectifiers 190 together with filter circuits 191 and 192 may also be employed in this solenoid circuit to assure instantaneous response when the switch 185 is closed. Switch 193 will be opened by energization of the cut relay to ensure that the cut has been made prior to the closing of limit switch 185.

On the return portion of the stroke, or at approximately 270° of rotation of the shaft 51, rotary limit switch 194 in the holding circuit of solenoid 186, which has been holding in such solenoid to continue operation of the high-speed clutch 120, opens to deenergize the solenoid 186. The deenergization of the high-speed clutch relay 187 as well as the accelerator clutch relay 173 closes the respective switches 195 and 196 energizing timer 197 which closes switches 198 and 199, energizing brake solenoid 200. This actuates brake 110 to bring shaft 51 to a stop which will be slightly beyond the starting position with the stop abutment 144 having snapped behind the face 146 of the cam 139. At this time, the timer 197 times out, opening switch 198 to deenergize the solenoid 200 controlling brake 110, and simultaneously the positioning of the stop abutment in the proper position beyond the face 146 of the cam 144 closes rotary limit switch 201 to energize repositioner relay 202. This relay closes holding switch 203 in parallel with switches 204 and 205 closed by the deenergization of the high-speed clutch relay 187 and the accelerator clutch relay 173, respectively. The repositioner relay 202 also closes switch 206 to energize repositioner solenoid 207. Energization of this solenoid causes piston-cylinder assembly 143 to extend so that the plunger 140 contacts the reset cam 138, counter-rotating the shaft 51 until the abutment 144 contacts the face of cam 139. At this time the rod 141 will have contacted limit switch 147 to deenergize relay 202, and thus solenoid 207, causing retraction of the piston-cylinder assembly 143 to clear the plunger 140 for the next cycle of operation.

A return position limit switch 208 will energize the reset relay 169, preparing the circuits for the next cycle of operation. This relay will be deenergized during the normal operation by normally closed switch 209 operated by the counter and normally closed switch 210 operated by the accelerator clutch relay 173. These switches, however, are in parallel with rotary limit switch 211 and holding switch 212 and the relay 169 will also be deenergized by the rotary limit switch 211.

Manual cut switch 213 may be actuated to cut a length manually at any desired point and such switch has contacts 214 in parallel with switch 166, thus serving the function of such switch actuated by the counter. Also, contacts 215 may be closed in the circuit 216 to reset the counter to zero.

Figure 10:
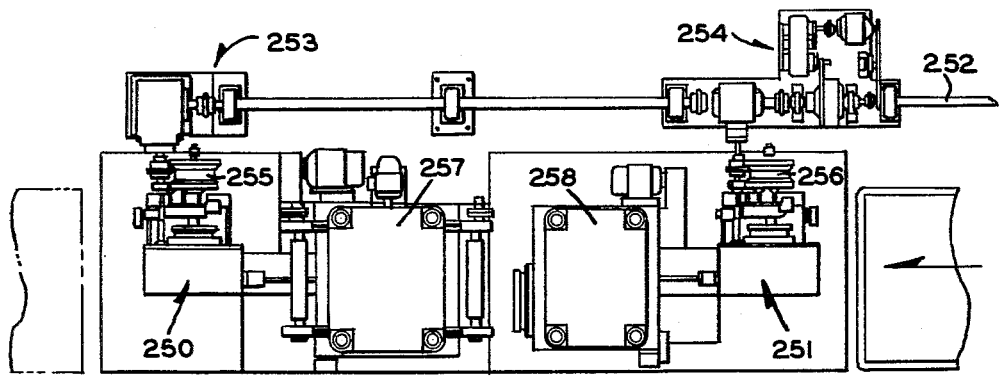
FIG. 10 is a fragmentary top plan view of a portion of a mill line employing two accelerators therein and showing the drive therefor.
Figure 11:
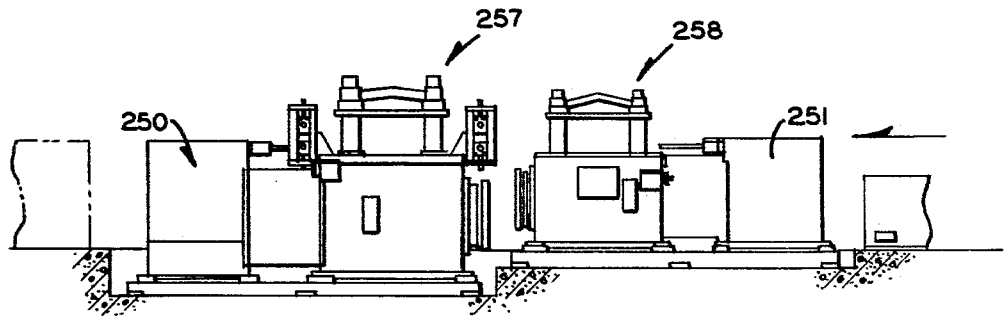
FIG. 11 is an elevational view of that portion of the mill line shown in FIG. 10.

Referring now to FIGS. 10 and 11, there is illustrated an application of the accelerator mechanism in which such may be employed in a forming line to operate a crimp press as well as a cut-off press. Referring first to FIG. 10, it will be seen that the accelerators 250 and 251 may both be driven from the drive shaft 252 of the forming mill. Compensation devices 253 and 254 may be employed for the respective accelerators 250 and 251, each of which drives the accelerators through the respective air clutches 255 and 256. This particular drive insures that whatever the mill speed setting, the die will travel at that same speed during the cutting cycle. It is noted that the accelerators 250 and 251 are placed on opposite sides of the crimp press 257 and cut-off press 258, respectively, which they control, and that the direction of rotation of the main shaft of the accelerator need only be reversed to obtain the proper movement of the respective cutting or crimping tool.

It can now be seen that there is provided a cut-off mechanism which may easily be installed on any mill line to operate through an electronic counter driven by the elongated stock itself quickly to accelerate a heavy or massive press to the speed of the stock to effect the severing thereof whereby very accurate lengths of cut may be obtained. It is noted that such accelerator when used in conjunction with a programming control can give a cut-to-length range of from 54 inches at 180 feet per minute to a theoretical maximum of infinity in increments of ten thousandths of an inch.

It may now readily be understood that the mechanism to accelerate the flying tool will be operated by the positioning of the drive shaft at a predetermined angular position and, responsive to a predetermined length of stock, such drive shaft will be connected to the mill to rotate such shaft initially at a constant angular velocity which is the speed of the mill drive, and then by translating the rotational movement of the shaft to a variable velocity linear movement for the tool, the speed of the tool may quickly be accelerated to the velocity of the stock or material to act thereon. Thus, the translation of the rotary movement of the shaft to the variable velocity linear movement of the tool is accomplished by the rotary movement of the slide as well as the varied radial movement thereof caused by force means in the form of the followers and associated drive and follower cams rigidly fixed to the machine frame.

Other modes of applying the principle of the invention may be employed, change being made as regards the details described, provided the features stated in any of the following claims, or the equivalent of such, be employed.

I, therefore, particularly point out and distinctly claim as my invention:

1. In a method of processing lengths of elongated moving stock by accelerating a flying tool to the speed of such stock in a mill and the like; the steps of positioning a drive shaft at a predetermined angular position, connecting such drive shaft to the drive of such mill upon the recepit of a stock length responsive signal to rotate such shaft at substantially constant angular velocity, translating rotational movement of such shaft to variable velocity linear movement to accelerate such tool to the speed of the stock, further translating such rotational movement to constant velocity linear movement at the speed of the stock, actuating such flying tool, disconnecting such drive shaft from the mill drive and further rotating such shaft at a higher angular velocity, and then further translating such rotational movement to variable velocity linear movement to return such tool to its original position as such shaft returns to its predetermined angular position.

2. In the method of claim 1, the steps of disconnecting such shaft near the end of one revolution thereof, braking such shaft to a stop, and then repositioning such shaft in such predetermined angular position.

3. In a method of processing lengths of elongated moving stock by accelerating a flying tool to the speed of such stock in a mill and the like; the steps of positioning a drive shaft in a predetermined angular position, connecting such shaft to the drive of such mill to rotate such shaft at substantially constant angular velocity, translating the rotational movement of such shaft to a variable velocity linear movement to accelerate such tool to the speed of such stock during substantially the first 45° of rotation of such shaft, translating such rotational movement of such shaft to a constant velocity linear movement at most during substantially the next 90° of rotation of such shaft, actuating such tool, disconnecting the mill drive to such shaft and connecting a high speed return drive thereto responsive to completion of actuation of such tool, rotating such shaft at high speed to approximately 270° of rotation of such shaft, disconnecting such high speed drive and braking such shaft to stop slightly beyond 360° of rotation of such shaft, counter rotating such shaft to 360° of rotation to place such shaft in such predetermined angular position.

4. In a flying tool for processing lengths of moving elongated stock in a mill line; an accelerator mechanism for imparting movement to said tool to obtain for said tool a constant velocity equal to the speed of such stock, said accelerator mechanism comprising a drive shaft, clutch means selectively to connect said shaft to the drive of said mill, a plate mounted on said shaft for rotation therewith and having a diametral slot therein, a slide mounted in such slot; force means to impart a controlled radial movement to said slide within said slot as said shaft and plate rotate; a drive pin mounted on said slide and being drivingly engaged with a slideway in a pivot arm, one end of said pivot arm being pivotally connected to said flying tool and the other end of said pivot arm being fixedly pivoted with respect to said flying tool whereby rotation of said drive pin about the axis of said drive shaft will pivot said pivot arm about said fixed pivot accelerating said tool to the speed of such stock with the controlled radial movement of said slide obtaining the constant velocity of said tool equal to the velocity of such stock; a high speed drive for said shaft, and means responsive to the completion of the tool actuation to disconnect the mill drive from said shaft and connect said high speed drive to said shaft to return said tool to its original position.

5. In the flying tool of claim 4, stock length responsive means to actuate said clutch to connect the drive of such mill to said shaft.

6. The flying tool of of claim 4 including brake means for said drive shaft, and means responsive to the rotational position of said drive shaft to disconnect said high speed drive and energize said brake means to bring said drive shaft to a stop.

7. The flying tool of claim 6 including means to counter-rotate said drive shaft to a predetermined starting position at the completion of a tool cycle, and time responsive means to deenergize said brake means and energize said means to counter-rotate said drive shaft.

8. The flying tool of claim 7 wherein said force means comprises a drive cam moving said slide radially in response to rotation of said plate.

9. The flying tool of claim 8 including a follower cam fixed adjacent said drive cam, and fixedly spaced followers for said respective drive and follower cams mounted on said slide ensuring the profile of said drive cam being traced positively to move said slide radially in response to rotation of said drive shaft.

10. In a flying tool for working lengths of moving stock in a mill line; an accelerator mechanism for imparting movement to said tool to obtain for said tool a constant velocity equal to the speed of such stock, said accelerator mechanism comprising a drive shaft, means selectively to connect said shaft to the drive of said mill, means to translate the rotational motion of said shaft to a linear motion of said flying tool to accelerate said tool to the velocity of such stock, a high speed drive, and means responsive to the completion of the tool work operative to connect said high speed drive to said shaft and disconnect said mill drive from said shaft to return said flying tool to its original position at a high angular velocity of said shaft.

11. The flying tool of claim 10 including means responsive to stock length to energize said means to connect said shaft to the drive of said mill.

12. The flying tool of claim 10 including means to translate the rotational motion of said drive shaft to a constant linear velocity of said flying tool after said flying tool has reached the velocity of such stock.

13. The flying tool of claim 10 including brake means for said drive shaft, and means responsive to the rotational position of said drive shaft to disconnect said high speed drive and energize said brake means to bring said drive shaft to a stop.

14. The flying tool of claim 13 including means to counter-rotate said drive shaft to a predetermined starting position at the completion of a tool cycle, and time responsive means to deenergize said brake means and energize said means to counter-rotate said drive shaft.

15. The flying tool of claim 14 wherein said means to counter-rotate said drive shaft comprises a piston-cylinder assembly operative to engage a projection on said shaft to counter-rotate the same when said assembly is extended.

16. The flying tool of claim 15 including means responsive to the repositioning of said shaft to such predetermined starting position operative to withdraw said piston-cylinder assembly.

17. In a reciprocating flying tool for working lengths of moving stock in a mill line; an accelerator mechanism for imparting movement to said tool in one direction to obtain for said tool a constant velocity equal to the speed of such stock, said accelerator mechanism comprising a drive shaft, means selectively to connect said shaft to the drive of said mill, a high speed drive, means responsive to the completion of the tool work operative to connect said high speed drive to said shaft and disconnect said mill drive from said shaft to drive said tool in said one direction at a high speed through the remainder of such movement of said tool in such direction, and at said high speed in the opposite direction to its original position.

References Cited in the file of this patent

UNITED STATES PATENTS

| | | |
|---|---|---|
| 1,614,554 | Hohn | Jan. 18, 1927 |
| 1,836,712 | Hallden | Dec. 15, 1931 |
| 1,936,331 | Lawson | Nov. 21, 1933 |
| 2,079,794 | Traut | May 11, 1937 |
| 2,155,629 | Zaveruka | Apr. 25, 1939 |
| 2,168,035 | Kitcat | Aug. 1, 1939 |
| 2,209,995 | Morris | Aug. 6, 1940 |
| 2,221,716 | Morton | Nov. 12, 1940 |
| 2,324,737 | Stevens | July 20, 1943 |
| 2,350,975 | Rodder | June 6, 1944 |
| 2,767,459 | Holman | Oct. 23, 1946 |
| 2,866,428 | Stanfield | Dec. 30, 1958 |